(12) United States Patent
Beck

(10) Patent No.: US 9,603,760 B2
(45) Date of Patent: Mar. 28, 2017

(54) LIFT APPARATUS FOR A VEHICLE

(71) Applicant: Passenger Lift Services Limited, Oldbury, West Midlands (GB)

(72) Inventor: Adam Beck, Oldbury (GB)

(73) Assignee: Passenger Lift Services Limited, Oldbury, West Midlands (GB)

( * ) Notice: Subject to any disclaimer, the term of this patent is extended or adjusted under 35 U.S.C. 154(b) by 0 days.

(21) Appl. No.: 14/782,825

(22) PCT Filed: Mar. 24, 2014

(86) PCT No.: PCT/GB2014/050911
§ 371 (c)(1),
(2) Date: Oct. 7, 2015

(87) PCT Pub. No.: WO2014/170634
PCT Pub. Date: Oct. 23, 2014

(65) Prior Publication Data
US 2016/0067121 A1    Mar. 10, 2016

(30) Foreign Application Priority Data

Apr. 19, 2013 (GB) .................................. 1307138.6

(51) Int. Cl.
*B60P 1/44* (2006.01)
*A61G 3/06* (2006.01)

(52) U.S. Cl.
CPC .............. *A61G 3/062* (2013.01); *B60P 1/445* (2013.01); *B60P 1/4414* (2013.01)

(58) Field of Classification Search
CPC ........ B60P 1/4414; B60P 1/4442; B60P 1/445
(Continued)

(56) References Cited

U.S. PATENT DOCUMENTS 2,656,058 A  *  10/1953  Foote .................... B60P 1/4414
                                                              212/180
2,732,960 A  *  1/1956  Nilson .................. B60P 1/4414
                                                              414/549

(Continued)

FOREIGN PATENT DOCUMENTS

BE          892548 A2      7/1982
EP        0 119 914 A1     9/1984
NL          7807296 A      1/1980

OTHER PUBLICATIONS

Search Report Under Section 17(5) mailed Oct. 8, 2013, for GB 1307138.6 filed Apr. 19, 2013.

(Continued)

*Primary Examiner* — Jonathan Snelting
(74) *Attorney, Agent, or Firm* — Wegman, Hessler & Vanderburg

(57) ABSTRACT

A lift apparatus (100) for a vehicle comprises a lifting platform (115) and a movable connection assembly (110) for deploying and operating the lifting platform (115). The movable connection assembly (110) comprises at least two pairs of hydraulically driven lifting arms (145, 146) on either side of the lifting platform (115) and pivotally connected at a first end to a base (140) and at a second end to the lifting platform (115), at least two hydraulic actuators being disposed in connection with each pair of arms (145, 146) acting in substantially the same direction as each other. The hydraulic actuators are powered by a common source. The lift can be used to allow wheelchair bound passengers to board the vehicle or for lifting heavy articles onto the vehicle.

8 Claims, 3 Drawing Sheets

(58) Field of Classification Search
USPC .......................................................... 414/917
See application file for complete search history.

(56) References Cited

U.S. PATENT DOCUMENTS

| | | | | |
|---|---|---|---|---|
| 4,711,613 A | * | 12/1987 | Fretwell | .................. B60P 1/445 |
| | | | | 414/550 |
| 5,588,793 A | * | 12/1996 | Chang | .................. B60P 1/4414 |
| | | | | 187/250 |
| 5,806,632 A | | 9/1998 | Budd et al. | |
| 6,065,924 A | | 5/2000 | Budd et al. | |
| 6,379,102 B1 | * | 4/2002 | Kameda | .................. A61G 3/06 |
| | | | | 414/546 |
| 2001/0026756 A1 | * | 10/2001 | Mortimore | ............ B60P 1/4442 |
| | | | | 414/556 |

OTHER PUBLICATIONS

International Search Report and Written Opinion mailed Jun. 17, 2014 for PCT/GB2014/050911 filed Mar. 24, 2014.
International Preliminary Report on Patentability mailed Oct. 20, 2015 for PCT/GB2014/050911 filed Mar. 24, 2014.

* cited by examiner

LIFT APPARATUS FOR A VEHICLE

CROSS-REFERENCE TO RELATED APPLICATIONS

This application claims the priority filing benefit of International PCT Application PCT/GB2014/050911 filed Mar. 24, 2014 and published under PCT 21(2) in the English language, Great Britain Patent Application Serial No. GB 1307138.6 filed Apr. 19, 2013. Each of the above listed applications is incorporated herein by reference.

The present application relates to a lift apparatus for a vehicle, for example a lift apparatus for providing access to a vehicle with a raised floor.

It is known to provide a vehicle with a lift apparatus that can be stowed, e.g. under the floor of the vehicle, and then deployed into a condition in which it can be lowered to the ground and raised to a position approximately level with a raised floor of the vehicle, for access to the vehicle. Such a lift apparatus is commonly used in city-to-city buses and long-distance coaches in mainland Europe. Space constraints within such vehicles call for the lift apparatus to make efficient use of available space.

In order to increase the lifting capacity of such lift apparatuses, it is known to increase a mechanical leverage in an operating mechanism for instance by increasing the separation of lifting arms in the mechanism. However, such approaches generally have the drawback of increasing the overall size of the apparatus.

An alternative approach to increasing the lifting capacity, in hydraulically powered lifting apparatuses is to upgrade a hydraulic power source to one that operates at a higher pressure. However, this approach leads to disproportionately large increases in the cost of the lift apparatus.

The invention provides a lift apparatus for a vehicle comprising a lift platform and a movable connection assembly. The movable connection assembly can comprise at least two pairs of hydraulically-driven lifting arms which may be disposed on either side of the lifting platform and can be pivotally connected at a first end to a base and at a second end to the lift platform. At least two hydraulic actuators can be disposed in connection with each pair of arms to act in substantially the same direction as each other. The hydraulic actuators may be powered by a common hydraulic source.

Embodiments of the invention advantageously allow an increase in the lifting capacity of the lift apparatus as compared to a lift apparatus with only one hydraulic actuator per pair of lifting arms, without increasing the size of the lift apparatus and without requiring a more powerful hydraulic source. Where two actuators per pair of lifting arms are provided, the lifting capacity approaches double that which is possible with only one hydraulic actuator. Further, the apparatus may be installed in a limited size compartment of a bus or coach, e.g. a compartment above the rear axle that would typically only be useful for carrying thin items of luggage such as ski equipment.

Embodiments of the invention disclosed herein provide a lifting capacity of greater than 500 kgs, which is more than ample to lift passengers in wheelchairs for example.

Each pair of lifting arms can comprise a first and a second lifting arm, a first and a second hydraulic actuator being disposed in between the arms. The first and second hydraulic actuators can have respective ends connected to the first and second lifting arms.

The first and second hydraulic actuators can be arranged so that their axes are co-planar. By virtue of this arrangement, the actuators can remain in between the lifting arms without any increase in the width of the apparatus.

The first hydraulic actuator can be located proximal to the base and can be connected at a first end to a proximal end region of the first lifting arm and can be connected at a second end to a mid-region of the second lifting arm, and the second hydraulic actuator can be located distal to the base and can be connected at a first end to a mid-region of the first lifting arm and can be connected at a second end to a distal end region of the second lifting arm.

Optionally, the distance from the first end of the first actuator to the first end of the second actuator is the same as the distance from the second end of the first actuator to the second end of the second actuator.

Optionally, the first and second lifting arms are connected to each other by a link. The link advantageously resists bowing of the arms due to the outward component of the forces applied by the actuators. The link can be disposed in the vicinity of the mid regions of the first and second arms, to provide the most effective prevention of bowing. The link can be disposed in parallel to the displacement between the pivotal connections of the first and second arms to the base, whereby movement of the lifting arms is not hindered by the link.

The invention may be better appreciated from the following description of preferred embodiments, by way of example only, with reference to the accompanying drawings in which.

Like elements in the described embodiments will be designated by the same reference numerals.

Figure 1:
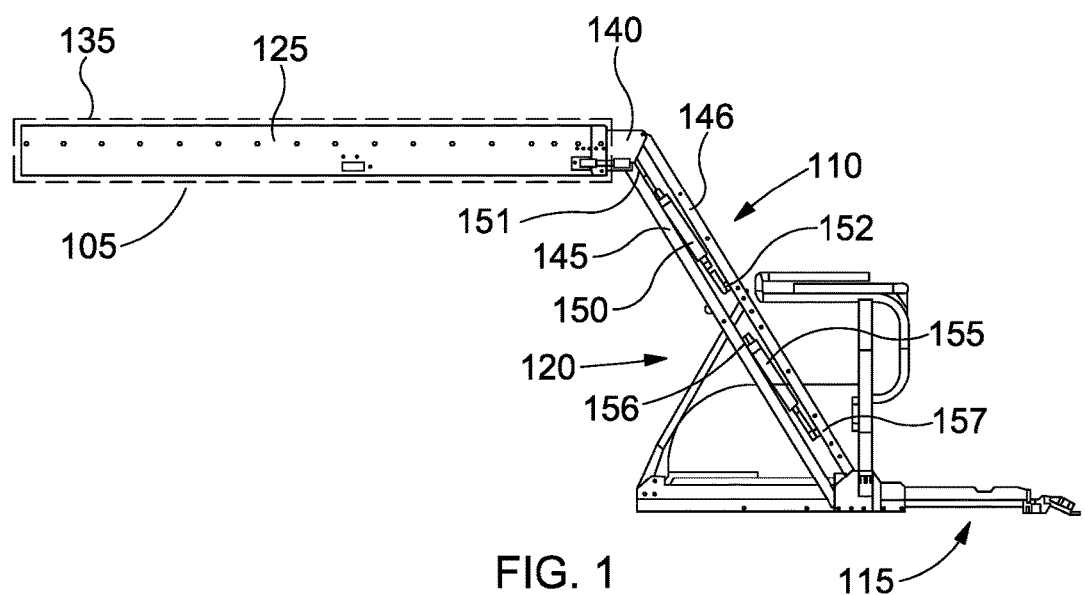
FIG. 1 is a side view of a lift apparatus in accordance with a first embodiment of the invention, showing the lift in a lowered position.
Figure 2:
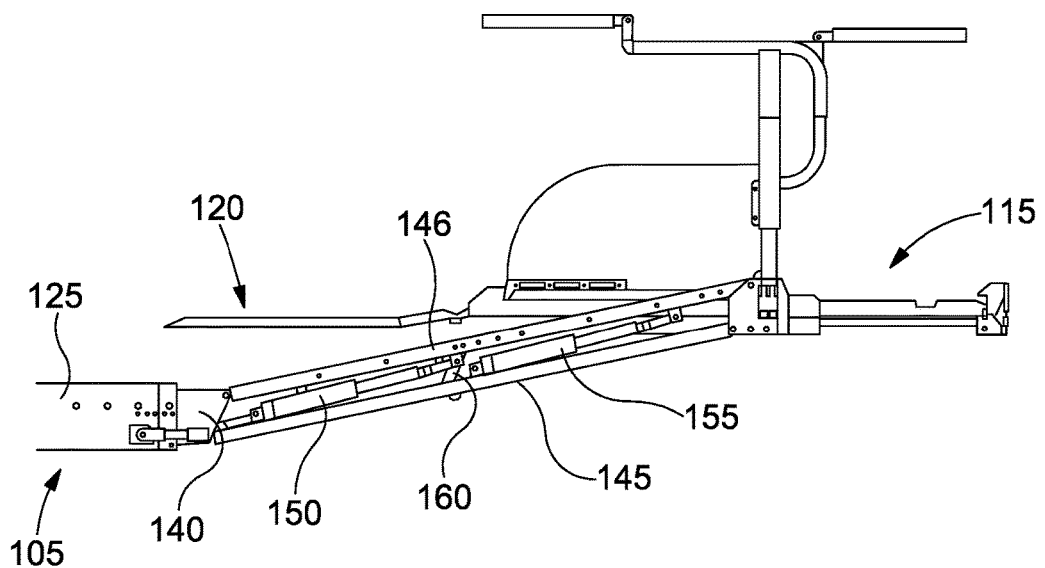
FIG. 2 is a side view of the first embodiment of the invention, showing the lift in a raised position.
Figure 3:
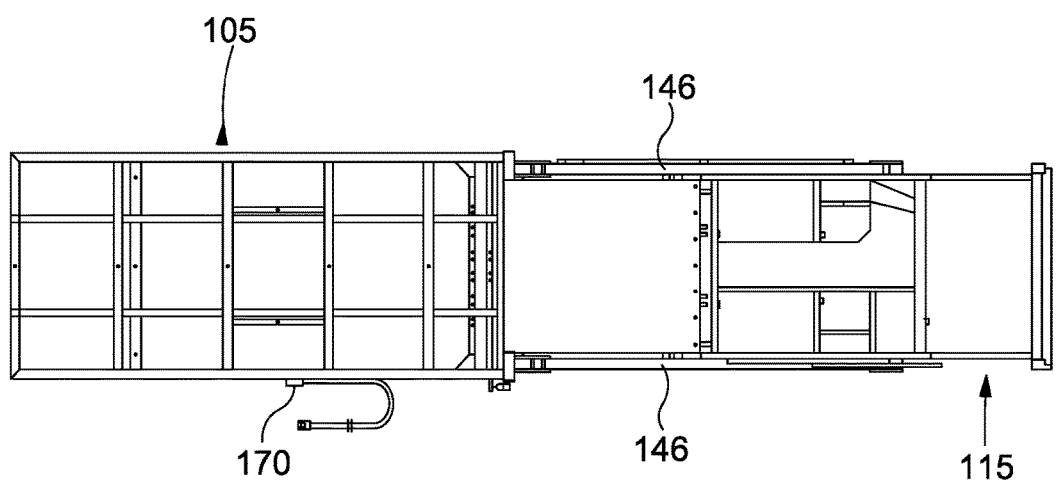
FIG. 3 is a top plan view of the first embodiment of the invention.

With reference to FIGS. 1 to 3, in a first embodiment of the invention there is a lift apparatus 100 for a vehicle (not shown) having a raised floor, such as a city-to-city bus or a long-distance coach. The lift apparatus 100 comprises a housing 105, a connection assembly 110, a lift platform 115 and a bridge plate 120.

The housing 105 comprises a main frame 125 (sometimes called a cassette) secured, e.g. welded or bolted, to the vehicle, e.g. under some steps or in a ski equipment storage space for gaining access to the vehicle, and defining a generally cuboid inner volume 135.

The connection assembly 110 comprises a base portion 140, slidably connected to the vehicle and driven by an electric motor (not shown). The electric motor is operable to cause the base portion 140 to slide relative to the main frame 125, thereby moving the lift platform 115 between a stowed condition and a deployed condition (as shown in FIG. 3). In the stowed condition of the lift platform 115, it 115, the connection assembly 110, and the bridge plate 120 are all contained within the inner volume 135 of the main frame 125.

The connection assembly 110 further comprises four hydraulically-driven lifting arms 145, 146 a pair of arms being provided either side of the lifting platform 115.

The left hand pair of arms 145, 146 is visible in FIGS. 1 and 2, and the right hand pair (not shown) is substantially similar, although is typically a mirror image of the left hand pair. A first arm 145 of the pair is situated beneath a second arm 146 of the pair and the two arms cooperate to raise or lower the lift platform 115 under the influence of first and second hydraulic actuators 150 and 155. The first hydraulic actuator is connected at one of its ends to a point 151 at a proximal end (i.e. near to the base 140) of the first arm 145 and the other end of the actuator is connected to a mid region of the second arm 146 at a connection point 152. The second hydraulic actuator 155 is connected at one of its ends to a point 156 at a mid region of the first arm and is connected to a distal end region of the second arm 146 via a connection point 157. In operation, the hydraulic actuators 150, 155 provide a linear biasing force in a direction substantially along the lifting arms 145, 146. Each lifting arm 145, 146 is pivotally connected at a first end to the base portion 140, and at a second end to the lift platform 115. The actuators 150, 155 remain parallel to each other throughout the range of their motion. The actuators are approximately parallel to the lifting arms 145, 146, or may act at a small angle thereto. The axes of the actuators are co-planar and they lie in the plane swept out by the motion of the lifting arms.

By increasing the number of hydraulic actuators, a greater force is applied to the lifting arms, without any increase in the hydraulic pressure required. A corresponding decrease in the speed of the lift apparatus accompanies the increase in strength. As well as providing the actuators in a serial arrangement as shown in FIGS. 1 and 2, it would also be possible to dispose multiple actuators side by side to increase the lifting capacity, but this would result in an increase in the width of the lift apparatus.

The hydraulic actuator and the electric motor are operable via a user-operable input device (not shown), which comprises two buttons and is connected to a controller that interprets signals from the input device and in response generates signals for controlling the hydraulic actuator and the electric motor. The lift apparatus is thus simple to use, with a first one of the buttons being usable both to deploy the apparatus using the electric motor and to effect raising of the lift under hydraulic power. The second button is then used both to lower the lift and stow the mechanism.

The lifting arms' pivotal connections to the lift platform 115 are arranged to maintain the lift platform 115 in a generally horizontal orientation as the lift platform 115 is lowered or raised.

The lift platform 115 is a rigid, generally rectangular structure dimensioned to receive an object, such as a passenger in a wheel chair, to be lifted to a raised floor (not shown) of the vehicle.

The bridge plate 120 is a rigid, generally rectangular structure connected via hinges to a vehicle side of the lift platform 115. Its dimensions are similar to, but slightly smaller than, the dimensions of the lift platform 115. Therefore, in a stowed condition of the bridge plate 120, it can be folded flat such that it extends in a plane slightly above and approximately parallel to the plane of the lift platform 115, fitting between the lifting arms 145.

Due to the pivotal connections of the lifting arms 145, movement of the lift platform 115 towards the raised position will describe an arc, the lift platform's movement having a horizontal component towards or away from the vehicle as it is lowered or raised.

FIG. 2 shows the lift apparatus 100 in its raised position, wherein the hydraulic actuators are extended. At this position, a person on a wheelchair can enter the vehicle.

In order to prevent bowing of the arms 145, 146 due to the outward (i.e. perpendicular to the arms) component of the force applied by the hydraulic actuators, a link bar 160 is pivotally disposed in the middle of the arms 145 and 146 and securely holds the arms together without restricting their motion around the pivotal connections between the arms and the base. The link bar is parallel to the displacement between the pivotal connections between the arms and the base. The link bar 160 is also parallel to the displacement between the pivotal connections between the arms 145, 146 and the lift platform 115. There are thus three points of pivoting interconnection between the lifting arms, whereby the arms can move with respect to one another. The end points of the arms lie on the corners of a parallelogram whose shape depends on the angle at which the arms are disposed.

In the raised position, the bridging plate 120 is lowered to a substantially horizontal position to allow access to the vehicle.

In the plan view of the lift apparatus shown in FIG. 3, a hydraulic input 170 is provided which allows the connection of a hydraulic source to the device. Alternatively, the lifting apparatus may include an integral hydraulic source.

The hydraulic power source operates at a pressure of approximately 250 Bar. The alternative approach of upgrading the power of the hydraulic pressure source and using a single hydraulic actuator with each pair of lifting arms would require a source that operates at around 400 Bar in order to lift 500 kgs, and such a source would be approximately four times more expensive than a normal source.

The invention claimed is:

1. A lift apparatus for a vehicle, the lift apparatus comprising: a lift platform; a movable connection assembly; and a base, the lift platform having two sides, and the movable connection assembly comprising on each of said two sides: a pair of hydraulically-driven lifting arms, each of said lifting arms having a first end pivotally connected to the base and a second end pivotally connected to the lift platform, and a first hydraulic actuator and a second hydraulic actuator disposed between said pair of lifting arms, the first and second hydraulic actuators being arranged to act in substantially the same direction as each other, and being powered by a common hydraulic source, wherein
   each of the lifting arms has a proximal end region, a mid-region and a distal end region, the first hydraulic actuator is located proximal to the base and has a first end which is connected to the proximal end region of the first lifting arm and a second end which is connected to the mid-region of the second lifting arm, and the second hydraulic actuator is located distal to the base and has a first end which is connected to the mid-region of the first lifting arm and a second end which is connected to the distal end region of the second lifting arm.

2. A lift apparatus according to claim 1, wherein the first and second hydraulic actuators each have respective ends connected to the first and second lifting arms.

3. A lift apparatus according to claim 1, wherein the first and second hydraulic actuators each has a respective axis, and the axes of the first and second hydraulic actuators are co-planar.

4. A lift apparatus according to claim 1, wherein a distance from the first end of the first actuator to the first end of the second actuator is the same as a distance from the second end of the first actuator to the second end of the second actuator.

5. A lift apparatus according to claim 1 further comprising a link, wherein the first and second lifting arms are connected to each other by the link.

6. A lift apparatus according to claim 5, wherein the link is disposed in the vicinity of the mid-regions of the first and second arms.

7. A lift apparatus according to claim 5, wherein the pivotal connections of the first and second arms to the base are separated by a displacement and the link is parallel to said displacement.

8. A lift apparatus according to claim 1, wherein the lift platform is movable to a lowered position in which the hydraulic actuators are in a retracted state, and to a raised position, in which the hydraulic actuators are in an extended state.

* * * * *